United States Patent [19]
Weaver

[11] Patent Number: 5,901,477
[45] Date of Patent: May 11, 1999

[54] TREE-REMOVING DEVICE

[76] Inventor: Vernon P. Weaver, 3123 Quail La., Longview, Tex. 75602

[21] Appl. No.: 08/968,553

[22] Filed: Nov. 12, 1997

Related U.S. Application Data

[60] Provisional application No. 60/031,416, Nov. 21, 1996.

[51] Int. Cl.[6] ................................................... A01G 23/06
[52] U.S. Cl. ............................................. 37/302; 144/34.1
[58] Field of Search ............................. 37/301, 302, 403, 37/404, 903; 111/100, 101; 144/34.1, 24.12

[56] References Cited

U.S. PATENT DOCUMENTS

| | | | |
|---|---|---|---|
| 2,618,871 | 11/1952 | Craven | 37/302 |
| 2,626,468 | 1/1953 | Dobrinich | 37/2 |
| 2,664,651 | 1/1954 | Woodward | 37/2 |
| 2,803,431 | 8/1957 | Cooper | 37/302 X |
| 2,886,286 | 5/1959 | Walls | 254/127 |
| 3,376,907 | 4/1968 | McNeal | 37/302 X |
| 3,377,724 | 4/1968 | Jones | 37/2 |
| 3,418,734 | 12/1968 | McConnell | 37/2 |
| 3,558,177 | 1/1971 | Snead | 37/302 X |
| 3,802,663 | 4/1974 | Widegren et al. | 37/302 X |
| 3,882,910 | 5/1975 | Peltola et al. | 144/24.12 X |
| 4,321,761 | 3/1982 | Hedblom | 37/2 |
| 4,893,783 | 1/1990 | Diener et al. | 37/302 X |
| 5,081,941 | 1/1992 | Weeks | 37/302 X |
| 5,333,693 | 8/1994 | Severeid | 171/82 |
| 5,671,788 | 9/1997 | Rewis | 37/302 X |

*Primary Examiner*—Thomas B. Will
*Assistant Examiner*—Robert Pezzuto
*Attorney, Agent, or Firm*—John M. Harrison

[57] ABSTRACT

A tree-removing device designed for mounting on a land vehicle such as a conventional bulldozer or tractor and having a bulldozer-type blade fitted with a power blade for cutting the roots of a tree and a tree jack for levering the tree from the ground after the roots are cut. The power blade is characterized by a frame pivoted to the bulldozer-type blade and a vertically-adjustable blade carrier mounted in the frame and internally fitted with a hydraulically-operated blade which may be extended into the ground from the blade carrier to cut the roots of a tree by operation of the land vehicle. The tree jack includes a jack frame pivoted to the land vehicle bulldozer-type blade and a mast extensibly attached to the jack frame, which jack frame is fitted at one end with a foot for engaging the tree. The mast includes hydraulic cylinders for both engaging the tree and causing the mast to pivot, thereby jacking the tree from the earth by operation of the jack frame foot.

16 Claims, 4 Drawing Sheets

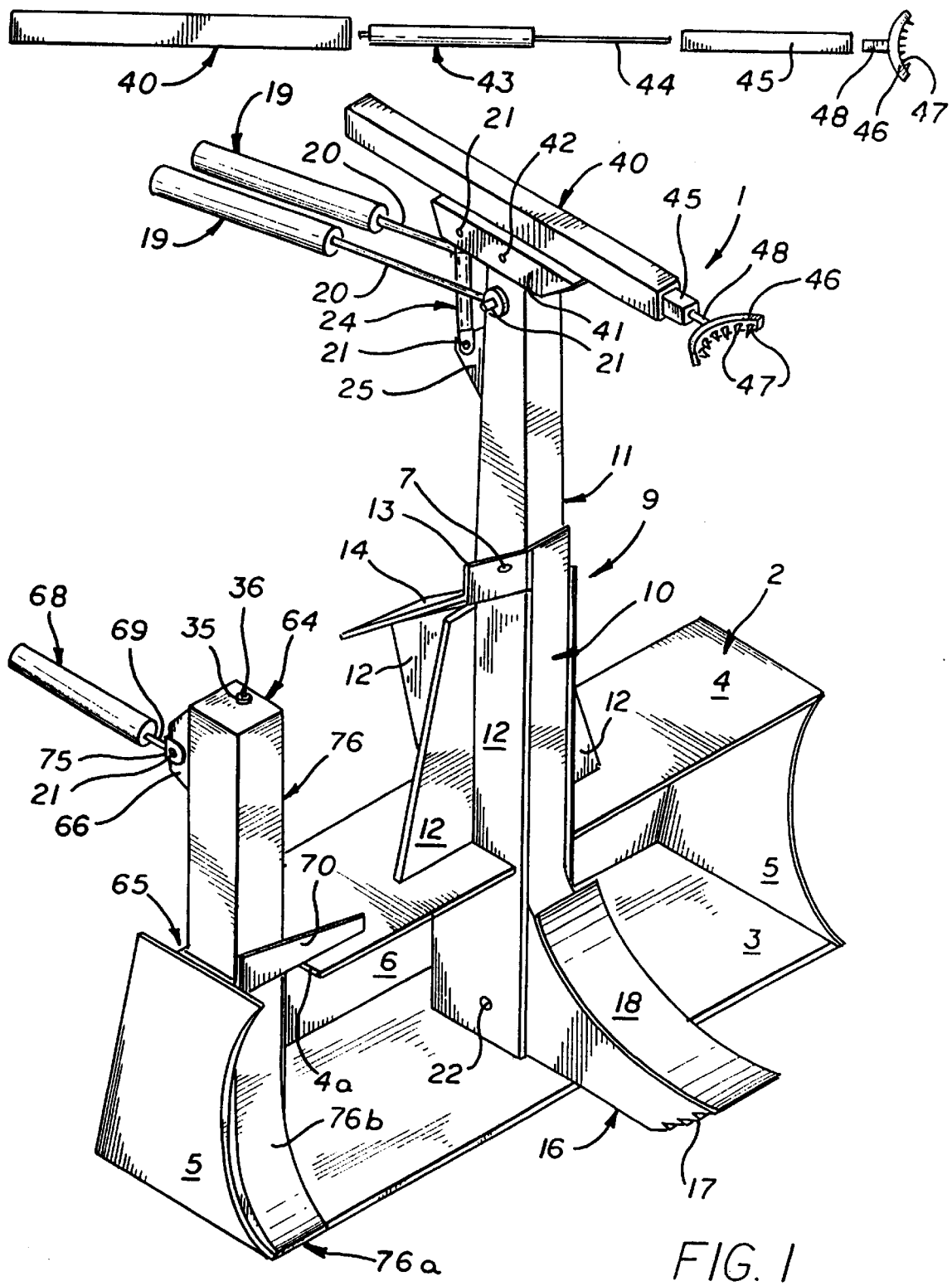

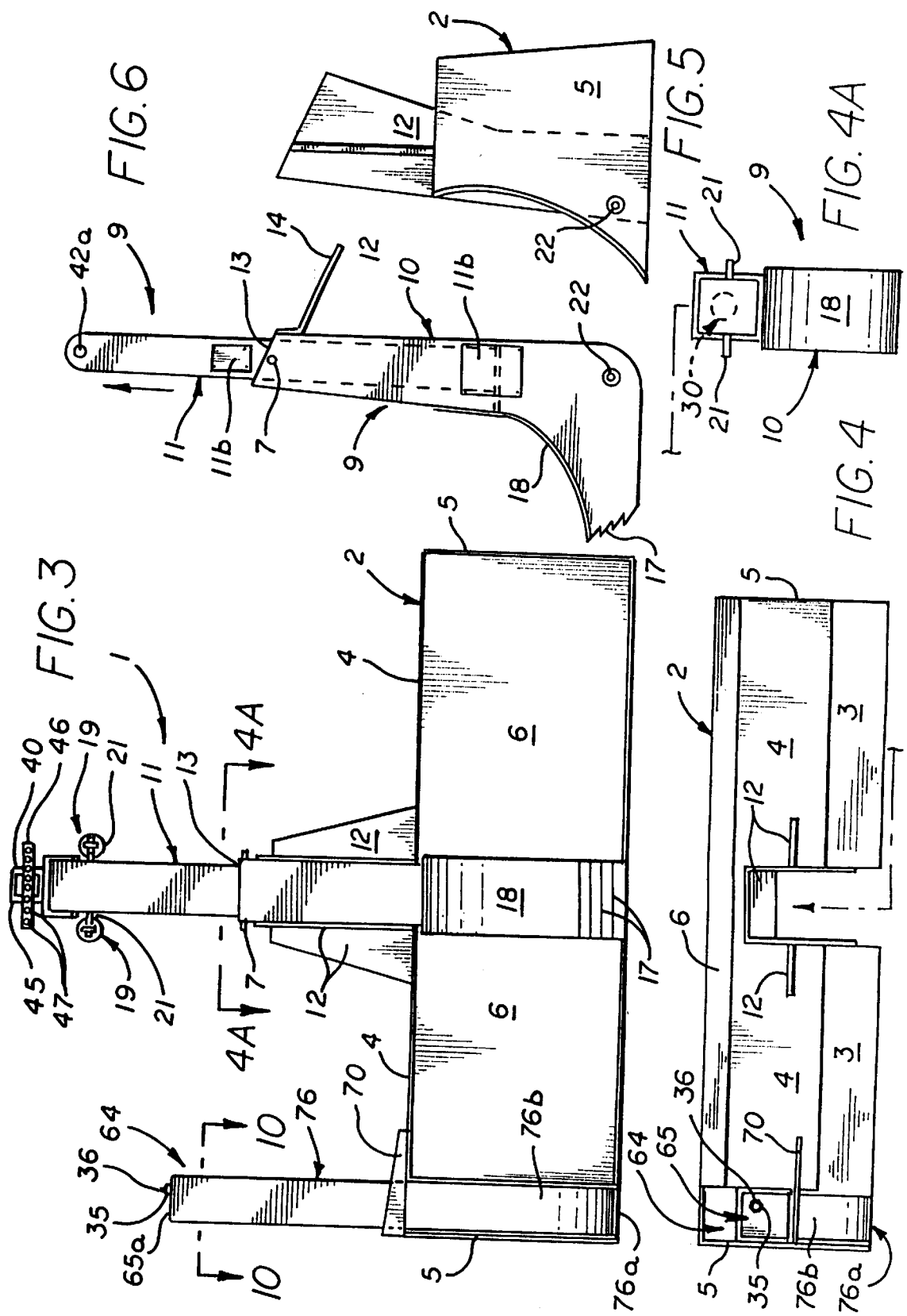

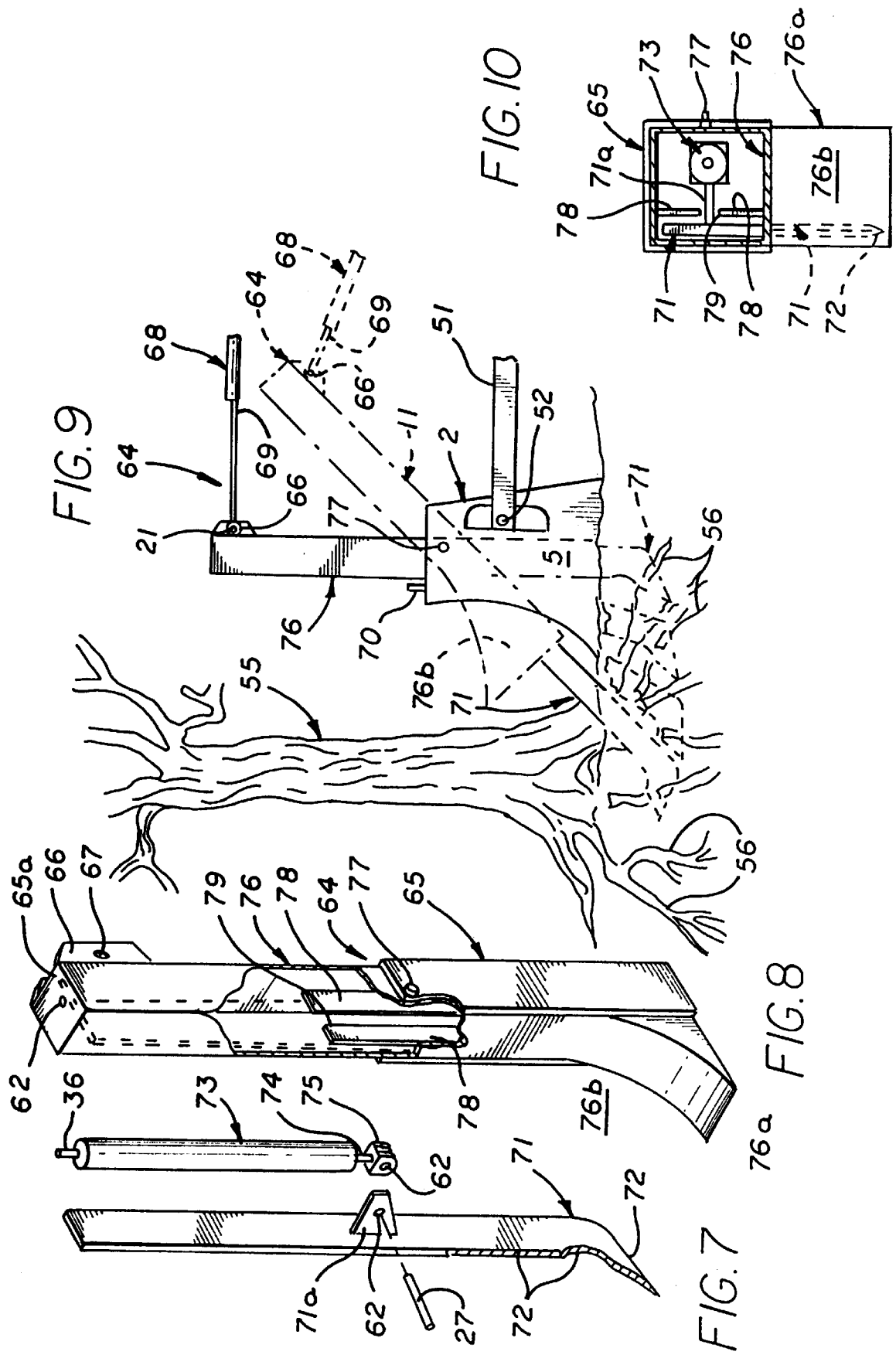

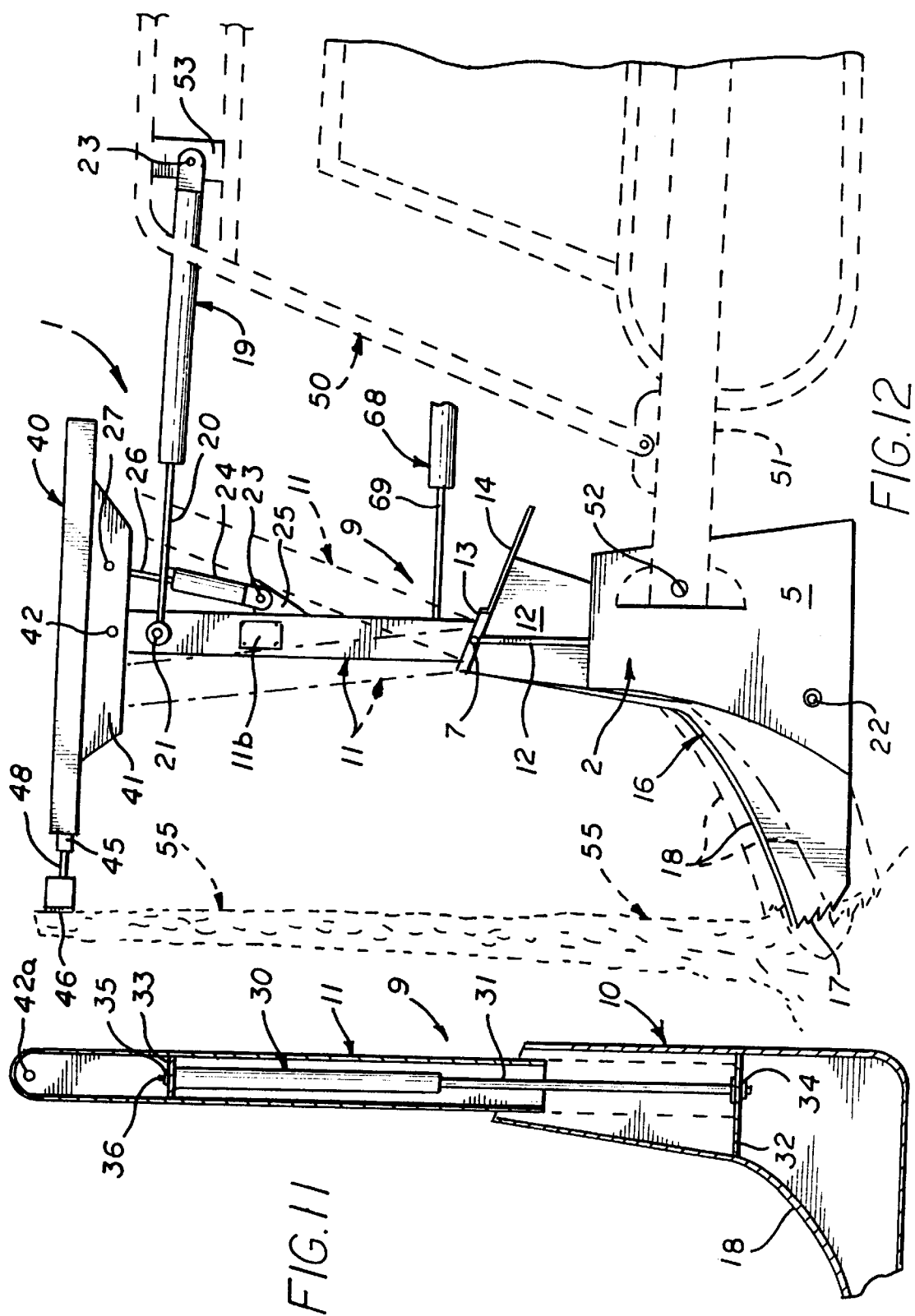

TREE-REMOVING DEVICE

CROSS-REFERENCE TO RELATED APPLICATIONS

This application is a continuation of U.S. Provisional Patent Application No. 60/031,416, filed Nov. 21, 1996.

BACKGROUND OF THE INVENTION

1. Field of the Invention

This invention relates to tree-removing equipment, and more particularly, to a tree-removing device designed for mounting on a conventional land vehicle, such as a tractor or bulldozer having a bulldozer-type blade fitted with a power blade for cutting the roots of a tree and a tree jack for levering the tree from the ground after the roots are cut. The power blade is characterized by a frame pivoted to one end of the bulldozer blade and seating a vertically-adjustable blade carrier internally fitted with a hydraulically-operated blade which may be extended into the ground from the blade carrier to cut the roots of the tree by operation of the bulldozer. The tree jack includes a jack frame pivoted to the bulldozer blade and a mast extensibly attached to the jack frame, which jack frame is fitted at one end with a foot for engaging the tree. The extending end of the mast is fitted with a hydraulically-operated stabilizing arm for engaging the tree and a pair of hydraulic cylinders extend between the bulldozer and the mast for causing the mast to pivot, thereby jacking the tree from the earth by operation of the jack foot.

One of the problems encountered in the lumber industry, as well as general purpose clearing of trees from land, is that of quickly, efficiently and safely removing the trees from the land. The problem is particularly acute under circumstances where it is desirable not only to remove the trees, but also the stumps and roots. The stumps and roots of trees must be removed from land in order to utilize the land for many types of structures, paving the land or other applications where stumps and roots are prohibitive for optimum land use.

2. Description of the Prior Art

Various tree-removing equipment and devices are known in the art. Typical of these devices are bulldozers with cutting blades and tractors with pincer-type devices designed to engage a tree approximately at ground level and by means of hydraulic pressure, operate a pair of pincers to cut the tree at that point, leaving the stump in the ground. Another technique includes using a bulldozer and a trackhoe. The trackhoe is used to dig around the trees and push them over. The bulldozer then moves the fallen trees and levels the ground. The stump may then be removed by bulldozers, stump cutters and alternative equipment known to those skilled in the art. Typical of devices used in such stump and small tree removal is the root ripping attachment for bulldozers detailed in U.S. Pat. No. 2,626,468, dated Jan. 27, 1953, to Dobrinich, Jr. The device includes a bulldozer fitted with an arm and a cutting blade attached to the arm, wherein the cutting blade can be extended into the ground and forward operation of the bulldozer effects cutting or ripping of the roots of the tree. A device for uprooting tree stumps is detailed in U.S. Pat. No. 4,321,761, dated Mar. 30, 1982, to Hedblom. The apparatus includes a vehicle, an arm carried by the vehicle and a tool attached to the arm, for engaging a stump. The tool includes two members movable relative to each other when the tool has been located in uprooting position relative to the stump. One of the members is adapted to rest against the ground while the tool lifts the stump by means of the relative movement of the members. U.S. Pat. No. 3,418,734, dated Dec. 31, 1968, to G. W. McConnell, details a "Subsurface Cutter Attachment For A Bulldozer". The attachment includes two upstanding frame members that are spaced in parallel relationship. Rearwardly-extending hooks are attached to the frame members, along with a rearwardly-extending spur. A cutter blade extends between the lower ends of the frame members and the forward edge of the cutter blade and the forward edges of the lower portion of the frame members are sharpened for cutting and reducing drag. Hooks and the spurs are arranged in such a manner that the attachment can be operatively engaged with or detached from a bulldozer blade upon proper movements of the bulldozer blade. U.S. Pat. No. 3,377,724, dated Apr. 16, 1968, to W. A. Jones, Jr., details a "Tree Pusher Attachment For Bulldozers". The attachment includes a bulldozer blade extending horizontally in front of the tractor or a bulldozer by means of pusher beams attached at the forward ends to the blade and connected at the rearward ends to the frame of the tractor for pivotal movement on a horizontal transverse axis. The tree pusher attachment includes a second pair of pusher beams pivoted at the rearward ends respectively, to the first pusher beams on a horizontal transverse axis and extending forwardly of the bulldozer blade, to rest on the upper edge thereof. U.S. Pat. No. 2,886,286, to P. J. Walls, details a "Transportable Lifter" for use in raising and transporting such objects as rocks, stumps or trees. The device is attached to a tractor, a bulldozer or like land vehicle and includes a beam adapted for attachment to the vehicle, a pivot adjacent to one end of the beam, a cranked lever mounted on the pivot, a fulcrum block pivoted to the cranked lever between the pivot and one end of the cranked lever and a mechanism for applying a turning force to the other end of the cranked lever. The fulcrum block is adapted to rest on the ground when the toe of the cranked lever is contacted with the ground, such that the toe may be raised by depressing the heel of the cranked lever. A "Combined Scarifying and Digging Attachment for Bulldozers" is detailed in U.S. Pat. No. 2,664,651, dated Jan. 5, 1954, to J. P. Woodward. The device includes a guide frame mounted directly on the blade assembly of a bulldozer and adapted to provide a track way for multiple rollers mounted at opposite ends of a stiffener frame assembly extending transversely of the guide frame. A series of digging tines are mounted on the stiffener frame assembly and are adjustable upwardly or downwardly, due to the rollable mounting of the stiffener frame assembly on the guide frame. U.S. Pat. No. 5,333,693, dated Aug. 2, 1994, to Severeid, details a "Tractor Mounted Implement For Removing Tree Stumps and the Like Buried in the Ground". The implement includes at least two components pivotally joined to form an articulating structure that shifts from a retracted position to an extended position upon forward movement of the tractor. The structure has a first end pivotally coupled to the tractor and a second end rigidly attached to a forked structure. The forked structure is disposed to engage a buried object and the tractor is then moved in a forward direction, causing the articulating components to shift from a retracted position to an extended position. As the articulating structure shifts to the extended position, the tines of the fork structure are lifted and rotated to lift the buried object.

It is an object of this invention to provide a tree-removing device for attachment to a conventional bulldozer, tractor or other land vehicle, which device includes a power blade for cutting the roots of a tree and a tree jack for levering the tree from the earth after the roots are cut by the power blade.

Another object of this invention is to provide a new and improved tree-removing device which is characterized by a bulldozer-type blade adapted for mounting on a bulldozer, tractor or other mobile equipment and further including an extensible power blade and tree jack mounted on the bulldozer blade for initially cutting the roots of a tree and subsequently jacking the tree from the ground after the roots are cut.

Still another object of this invention is provided in a new and improved tree-removing device or apparatus which includes a specially designed bulldozer-type blade for mounting on a bulldozer, tractor or other land vehicle, which bulldozer-type blade is fitted on one end with an extensible and pivoting power blade and in the center thereof with an extensible and pivoting tree jack, for initially cutting the roots of the tree around the tree by operation of the power blade and subsequently jacking or levering the tree from the ground by operation of the tree jack.

SUMMARY OF THE INVENTION

These and other objects of the invention are provided in a new and improved tree-removing device which is characterized by a specially designed bulldozer-type blade adapted for mounting on the front end of a bulldozer or tractor. The bulldozer-type blade is fitted with a power blade on one end, which power blade includes a blade housing pivotally attached to the bulldozer-type blade and a root-cutting blade extensively mounted in the power blade frame for selective extension by hydraulic power beneath the surface of the ground to cut the roots of a tree in advance of removing the tree from the ground. A tree jack has a jack frame pivotally attached to the center of the bulldozer-type blade and the jack frame includes a curved foot having teeth on the end thereof for engaging the tree. A mast is telescopically mounted in the jack frame and operate by a pair of hydraulic cylinders linked to the bulldozer, such that the curved foot engages the tree and the mast, jack frame and foot are pivoted with respect to the bulldozer-type blade, for jacking the rootless tree from the ground.

The invention will be better understood by reference to the accompanying drawings, wherein:

FIG. 1 is a perspective view of a preferred embodiment of the tree-removing device of this invention;

FIG. 2 is an exploded view of a stabilizing arm element of the tree-removing device;

FIG. 3 is a front view of the tree-removing device illustrated in FIG. 1;

FIG. 4 is a top view of the tree-removing device illustrated in FIGS. 1 and 3, with the tree jack element remove for brevity;

FIG. 4A is a top view of the tree jack element of the tree-removing device illustrated for insertion in a complementary portion of the tree-removing device illustrated in FIG. 4;

FIG. 5 is a side view of the tree-removing device illustrated in FIG. 4;

FIG. 6 is a side view of the tree jack element of the tree-removing device illustrated in FIG. 4A;

FIG. 7 is an exploded perspective view of the power blade element of the power blade device of the tree-removing device illustrated in FIG. 1;

FIG. 8 is a perspective view of the power blade frame and internal components of the power blade device illustrated in FIG. 1;

FIG. 9 is a side view of the tree-removing device illustrated in FIG. 1, with the tree jack element removed for brevity, more particularly illustrating operation of the power blade illustrated in FIGS. 7 and 8 to cut the roots of a tree prior to jacking the tree from the ground;

FIG. 10 is a top view of the power blade illustrated in FIGS. 7 and 8, with the frame top removed, more particularly illustrating a preferred mounting of the power blade element in the blade carrier;

FIG. 11 is a side sectional view of the tree jack component of the tree-removing device of this invention; and FIG. 12 is a side view of the tree-removing device illustrated in FIG. 1 with the power blade removed for brevity, more particularly illustrating operation of the tree jack for jacking a tree from the ground.

DESCRIPTION OF THE PREFERRED EMBODIMENTS

Referring initially to FIGS. 1–6 of the drawings the tree-removing device of this invention is generally illustrated by reference numeral 1. The tree-removing device 1 includes a bulldozer-type blade 2, typically having a blade base 3 and a blade top 4 spaced from the blade base 3 by blade ends 5 and closed at the rear by the blade back 6, as illustrated in FIG. 1. A tree jack is generally illustrated by reference numeral 9 is mounted in the center of the bulldozer-type blade 2 and includes a jack frame 10 pivotally seated in frame mount plates 12, typically welded to the blade top 4, blade back 6 and blade base 3 of the bulldozer-type blade 2, as further illustrated in FIG. 1. In a preferred embodiment the jack frame 10 is pivoted by means of a jack pivot pin 22, to a pair of parallel frame mount plates 12 extending between the blade base 3 and the blade top 4 of the bulldozer-type blade 2. The lower end of the jack frame 10 terminates in a jack foot 16 having a foot curvature 18 and further provided with foot teeth 17 at the extending end thereof. A stop plate 13 terminates the opposite or upper end of the jack frame 10 and a flexible trash flap 14 is attached to the rear portion of the stop plate 13, as further illustrated in FIGS. 1 and 6, to prevent limbs, bark and trash from entering the space between the parallel frame mount plates 12 when the jack frame 10 is pivoted on the jack pivot pin 22. A mast 11 is telescopically mounted in the jack frame 10 and is fitted with a stabilizing arm 40 on the top end thereof. As illustrated in FIGS. 1 and 2, the stabilizing arm 40 includes an arm flange 41, which is attached to the top end of the mast 11 by means of an arm pivot pin 42, extending through a pivot pin opening 42a provided in the top end of the mast 11, as illustrated in FIGS. 1 and 6. A mast locking pin 7 projects through aligned openings (not illustrated) in the jack frame 10 and in selected spaced sets of aligned openings (not illustrated) in the mast 11, to maintain vertical extension of the mast 11 from the jack frame 10 in a selected orientation, as illustrated in FIGS. 1, 3, 6 and 12.

An arm positioning cylinder 24 has one end attached to a positioning cylinder bracket 25, welded to the upper end of the mast 11, and the positioning cylinder bracket piston 26 is connected to one end of the arm flange 41 of the stabilizing arm 40, by means of a piston pivot pin 21, as further illustrated in FIG. 1. Accordingly, since the stabilizing arm 40 is pivotally mounted to the upper end of the mast 11 by means of the arm flange 41 and the arm pivot pin 42, operation of the arm positioning cylinder 24 facilitates pivoting the stabilizing arm 40 with respect to the mast 11, for purposes which will be hereinafter further described. An extension arm 45 is telescopically mounted in the stabilizing arm 40 and a plate rod 48 projects from the extending end of the extension arm 45 and mounts a curved tree-engaging plate 46, having plate teeth 47, as further illustrated in FIGS.

1 and 2. As also illustrated in FIGS. 1 and 2, a stabilizing arm cylinder 43 is located inside the stabilizing arm 40 with the extension arm 45 and is fitted with a stabilizing arm cylinder piston 44 for attachment to the extension arm 45. Accordingly, operation of the stabilizing arm 40 facilitates selective extension and retraction of the extension arm 45 inside the stabilizing arm 40 to, in turn, extend and retract the tree-engaging plate 46, for purposes which will be hereinafter further described.

Referring again to FIGS. 1 and 3 of the drawings, a pair of jack cylinders 19 are fitted with jack cylinder pistons 20, the ends of which are attached to the upper end of the mast 11 by means of a piston pivot pin 21. The opposite ends of the respective jack cylinders 19 are attached by means of corresponding cylinder pivot pins 23 to the spaced cylinder mount plates 53, respectively, mounted on the frame of a bulldozer 50, the front portion of which is illustrated in phantom in FIG. 12. As further illustrated in FIG. 12, the bulldozer-type blade 2 is attached to the extending ends of a pair of bulldozer push arms 51, also illustrated in phantom, by means of corresponding push arm pins 52, respectively. Accordingly, it will be appreciated from a further consideration of FIG. 12 that operation of the parallel jack cylinders 19 facilitates pivoting of the mast 11 and jack frame 10 of the tree jack 9 on the jack pivot pin 22 with respect to the bulldozer-type blade 2, as illustrated in phantom.

Referring now to FIGS. 1, 3, 7, 8 and 10 of the drawings the tree-removing device 1 is further characterized by a power blade 64, mounted on one end of the bulldozer-type blade 2 and characterized by a blade carrier 76, which is attached to the bulldozer-type blade 2 by means of a power blade pivot pin 77, as illustrated in FIG. 8. A blade carrier 76 is telescopically mounted in the power blade frame 65 and the blade carrier 76 terminates at the bottom end in a carrier foot 76a, having a foot curvature 76b, as further illustrated in FIGS. 1 and 8. The opposite or upper end of the blade carrier 76 is capped with a frame top 65a and is fitted with a frame bracket 66, which receives the power blade cylinder piston 69 of a power blade cylinder 68, as illustrated in FIG. 1. In a typical installation arrangement, a piston pivot pin 21 is inserted through a piston clevis 75, attached to the power pin cylinder piston 69 and through the aligned bracket pin opening 67 in the frame brackets 66, to pivotally mount the power blade cylinder piston 69 on the frame bracket 66. The opposite end of the power blade cylinder 68 is attached to the bulldozer 50 in the same manner as the jack cylinders 19 illustrated in FIG. 1, to facilitate pivoting of the blade carrier 76 and the power blade frame 65 in concert on the power blade pivot pin 77 by operation of the power blade cylinder 68, as further hereinafter described.

As further illustrated in FIG. 1 a blade top slot 4a is provided in the blade top 4 adjacent to the power blade frame 65 and the blade carrier 76 to facilitate pivotal movement of the carrier foot 76a forwardly on the power blade pivot pin 77. A frame stop plate 70 spans the blade top slot 4a at the blade top 4 to facilitate limited movement or pivoting of the carrier foot 76a outwardly of the bulldozer-type blade 2.

As further illustrated in FIGS. 1, 7, 8 and 10 of the drawings the blade carrier 76 is telescopically operated inside the power blade frame 65 of the power blade 64 by means of a blade operating cylinder 73, the top end of which is attached to the frame top 65a by means of a cylinder nut 35, threaded on cylinder pin 36, projecting through a pin opening 62 in the frame top 65a (FIGS. 1 and 8). The edges of a pair of blade guides 78 are longitudinally welded inside the blade carrier 76 and are spaced apart to define a guide slot 79, as further illustrated in FIGS. 8 and 10. An elongated blade 71, having a curved blade edge 72 at the bottom end thereof, is fitted with a blade bracket 71a and is disposed inside the blade carrier 76, as illustrated in FIGS. 7, 8 and 10. The piston clevis 75 attached to the blade operating cylinder piston 74 of the blade operating cylinder 73 is secured to the blade bracket 71a by means of a piston mount pin 27, which extends through aligned pin openings 62 in the blade bracket 71a and the piston clevis 75, respectively. Furthermore, the blade bracket 71a is disposed in the guide slot 79 defined by the spaced blade guides 78, such that operation of the blade operating cylinder 73 effects selective extension and retraction of the blade 71 from the blade carrier 76, as hereinafter further described.

Referring now to FIG. 11 of the drawings, the mast 11 is telescopically adjustable with respect to the jack frame 10 in the same manner as the blade 71 telescopically adjusts with respect to the blade carrier 76 and the power blade frame 65. Accordingly, a mast elevating cylinder 30 is disposed inside the mast 11 and is attached to a mast mount plate 33 by means of a cylinder nut 35, tightened on a cylinder pin 36, projecting from the end of the mast elevating cylinder 30. A mast elevating cylinder piston 31 extends from the opposite end of the mast elevating cylinder 30 and is similarly attached by means of a piston nut 34, to a frame mount plate 32, welded to the interior of the jack frame 10, as illustrated. Accordingly, operation of the mast elevating cylinder 30 effects selective extension and retraction of the mast 11 to and from the jack frame 10, for purposes which will be hereinafter further described.

Referring now to FIGS. 7–9 of the drawings, in operation, when it is desired to remove the tree 55, the bulldozer 50, a portion of which is illustrated in phantom in FIG. 12, is driven to a point spaced from the tree 55, as illustrated in FIG. 9. The blade operating cylinder 73 in the power blade 64 is then operated by means of suitable air or hydraulic lines, valves, pumps and controls (not illustrated) which are well known to those skilled in the art, to extend the blade 71 into the ground a selected depth, depending upon the size of the tree 55 and the bulldozer 50 is moved forwardly to cut the roots 56 of the tree 55, by means of the blade 71. This procedure is effected on four sides of the tree 55, to effect severing of the root system substantially the entire distance around the tree 55. Under circumstances where the ideal positioning of the power blade 64 with respect to the tree 55 is not possible because of the proximity of other trees, the bulldozer 50 is maneuvered into position as illustrated in FIG. 9, the blade 71 extended by operation of the blade operating cylinder 73 (using suitable controls) as illustrated and the power blade cylinder 68 then operated to pivot the blade carrier 76 of the power blade 64 with respect to the power blade frame 65 and the bulldozer-type blade 2 and swing the blade 71 in an arc as illustrated in phantom in FIG. 9, to cut the roots 56 of the tree 55. This procedure can be duplicated in other areas around the tree 55 to effect the desired cutting of the roots 56 prior to removing the tree 55, as hereinafter described.

After the roots 56 of the tree 55 have been cut as described above, the tree 55 is removed from the ground as follows. Referring now to FIG. 12 of the drawings the bulldozer 50 is positioned with the foot teeth 17 of the jack foot 16 engaging the tree 55 at or near ground level, as illustrated in phantom. The stabilizing arm cylinder 43, located in the stabilizing arm 40, is then operated by means of suitable controls to extend the extension arm 45 and the tree-engaging plate 46 into engagement with the tree 55, as further illustrated in FIG. 12. Pressure is then applied by the jack foot 16 to the base of the tree 55 by operation of the jack cylinders 19, while simultaneous pressure is applied to the tree 55 by means of the stabilizing arm cylinder 43 and the tree-engaging plate 46. Continued pressure applied to the tree 55 by means of the foot teeth 17 of the jack foot 16 effects leverage on the tree 55 and causes the tree 55 to be extracted from the ground with reduced resistance, since the roots 56 have been previously cut by operation of the power blade 64. Accordingly, the tree 55 may be quickly and easily removed from the ground by operation of the tree-removing device 1 without disturbing the soil around the tree 55, leaving only the necessity of filling the stump hole.

It will be appreciated that during the process of levering the tree 55 from the ground, the stabilizing arm 40 can be adjusted by operation of the arm positioning cylinder 24 to raise or lower the tree-engaging plate 46 and avoid limbs extending from the tree 55. Furthermore, mast 11 and the stabilizing arm 40 can be vertically adjusted by operation of the mast elevating cylinder 30 after removal of the locking pin 7, and the locking pin 7 then re-inserted to maintain the mast 11 in a selected elevation with respect to the jack frame 10 to effect more efficient operation of the tree-removing device 1. During transportation, it is usually expedient to lower the mast 11 in the same manner to reduce the overall height of the tree-removing device 1 for transportation purposes.

It will be further appreciated that a tree stump may be quickly and easily removed by operation of the tree-removing device 1. Accordingly, the procedure outlined above is effected with the exception of using the stabilizing arm 40 and the stump can be levered from the ground in the same manner as described above by operation of the jack foot 16 after cutting the roots with the power blade 64 as heretofore described.

It will be further appreciated by those skilled in the art that the bulldozer-type blade 2 can be used conventionally as a dirt or cutter blade, with the power blade 64 and the tree jack 9 in place, as desired. Furthermore, the bulldozer-type blade 2 can be a conventional bulldozer blade of selected design, modified to receive and mount the tree jack 9 and power blade 64, with the accompanying operating jack cylinders 19 and power blade cylinder 68 installed, as described above.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A tree-removing device comprising a first blade adapted for location in close proximity to a tree; a power blade frame pivotally carried by said first blade and a root cutting blade extensible and retractibly carried by said power blade frame for selectively extending from said power blade frame into the ground and cutting the roots of the tree in operational mode and retracting inside said power blade frame in retracted mode; and a jack frame pivotally carried by said first blade; a jack foot extending from said jack frame; for engaging the tree; a mast extensible and retractibly carried by said jack frame; fluid-operated cylinder means mounted on said mast for pivoting said mast, said jack frame and said foot with respect to said first blade, and stabilizing arm means pivotally carried by said mast for engaging the tree above said jack foot and stabilizing the tree responsive to pivoting of said jack frame and said jack foot and removing the tree from the ground.

2. The tree-removing device of claim 1 wherein said stabilizing arm means comprises a stabilizing arm pivotally attached to said mast; an extension arm extensibly and retractibly carried by said stabilizing arm; and a tree-engaging plate provided on said extension arm for engaging the tree.

3. A device for attachment to a land vehicle and removing trees from the ground, comprising a first blade attached to the land vehicle; a power blade frame pivotally carried by one end of said first blade, and a root-cutting blade extensibly and retractibly disposed in said power blade frame for selectively extending from said power blade frame and cutting the roots of the tree; a jack frame pivotally mounted substantially in the center of said first blade; a jack foot extending from one end of said jack frame for engaging the tree; a mast extensibly and retractibly extending from the opposite end of said jack frame; and stabilizing arm means pivotally carried by said mast for engaging the tree above said jack foot and stabilizing the tree, whereby said first blade is first maneuvered around the tree with said root-cutting blade extended from said power blade frame for cutting the roots of the tree and said first blade is then maneuvered in close proximity to the tree, said jack foot and said stabilizing arm means are engaged with the tree and said jack frame and said jack foot are pivoted with respect to said first blade to remove the tree from the ground.

4. The device of claim 3 wherein said stabilizing arm means comprises a stabilizing arm pivotally attached to said mast; an extension arm extensibly and retractibly carried by said stabilizing arm; and a tree-engaging plate provided on said extension arm for engaging the tree.

5. The tree-removing device of claim 3 comprising a blade-operating, fluid-actuated cylinder provided in said power blade frame and attached to said root cutting blade for selectively extending and retracting said root cutting blade in said power blade frame.

6. The tree-removing device of claim 4 comprising a stabilizing arm, fluid-actuated cylinder provided in said stabilizing arm and attached to said extension arm for selectively extending and retracting said tree-engaging plate in said stabilizing arm.

7. The tree-removing device of claim 6 comprising a blade-operating, fluid-actuated cylinder provided in said power blade frame and attached to said root cutting blade for selectively extending and retracting said root cutting blade in said power blade frame.

8. The tree-removing device of claim 3 comprising a mast-elevating, fluid-actuated cylinder provided in said mast and attached to said jack frame for selectively extending and retracting said mast in said jack frame and locating said stabilizing arm means in a selected position with respect to the tree.

9. The tree-removing device of claim 8 wherein said stabilizing arm means comprises a stabilizing arm pivotally attached to said mast; an extension arm extensibly and retractibly carried by said stabilizing arm; and a tree-engaging plate provided on said extension arm for engaging the tree.

10. The tree-removing device of claim 9 comprising a stabilizing arm, fluid-actuated cylinder provided in said stabilizing arm and attached to said extension arm for selectively extending and retracting said tree-engaging plate in said stabilizing arm.

11. The tree-removing device of claim 10 comprising a blade-operating, fluid-actuated cylinder provided in said power blade frame and attached to said root cutting blade for selectively extending and retracting said root cutting blade in said power blade frame.

12. A device for attachment to a bulldozer and removing trees from the ground, comprising a bulldozer-type blade attached to the bulldozer; a power blade frame pivotally carried by one end of said bulldozer-type blade and a root-cutting blade extensibly and retractibly disposed in said power blade frame for selectively extending from said power blade frame and cutting the roots of the tree; a jack frame pivotally mounted substantially in the center of said bulldozer-type blade; a curved jack foot extending from one end of said jack frame for engaging the tree; a mast extensibly and retractibly extending from the opposite end of said jack frame from said one end; and stabilizing arm means pivotally carried by said mast for engaging the tree above said jack foot and stabilizing the tree, whereby said bulldozer-type blade is first maneuvered around the tree by operation of the bulldozer, with said root-cutting blade extended from said power blade frame for cutting the roots of the tree and said bulldozer-type blade is then maneuvered in close proximity to the tree, said jack foot and said stabilizing arm means are engaged with the tree and said jack frame and said jack foot are pivoted with respect to said bulldozer-type blade to remove the tree from the ground.

13. The device of claim 12 wherein said stabilizing arm means comprises a stabilizing arm pivotally attached to said mast; an extension arm extensibly and retractibly carried by said stabilizing arm; and a tree-engaging plate provided on said extension arm for engaging the tree.

14. The device of claim 13 comprising a blade-operating, fluid-actuated cylinder provided in said power blade frame and attached to said root cutting blade for selectively extending and retracting said root cutting blade in said power blade frame.

15. The device of claim 14 comprising a stabilizing arm, fluid-actuated cylinder provided in said stabilizing arm and attached to said extension arm for selectively extending and retracting said tree-engaging plate in said stabilizing arm.

16. The device of claim 15 comprising a mast-elevating, fluid-actuated cylinder provided in said mast and attached to said jack frame for selectively extending and retracting said mast in said jack frame and locating said stabilizing arm means in a selected position with respect to the tree.

* * * * *